(12) United States Patent
Groves et al.

(10) Patent No.: US 6,793,048 B1
(45) Date of Patent: Sep. 21, 2004

(54) SOLENOID ACTUATED CONTINUOUSLY VARIABLE SHOCK ABSORBER

(75) Inventors: Gary W. Groves, Monroe, MI (US);
Karl Kazmirski, Toledo, OH (US);
David L. Steed, Perrysburg, OH (US);
Michael L. Zebolsky, Tecumseh, MI (US)

(73) Assignee: Tenneco Automotive Operating Company Inc., Forest Lake, IL (US)

( * ) Notice: Subject to any disclaimer, the term of this patent is extended or adjusted under 35 U.S.C. 154(b) by 427 days.

(21) Appl. No.: 09/624,120

(22) Filed: Jul. 24, 2000

(51) Int. Cl.[7] .................................................. F16F 9/46
(52) U.S. Cl. ................................... 188/266.6; 188/314
(58) Field of Search ................................. 188/314, 315, 188/313, 312, 266.5, 266.6, 320.14, 282.6

(56) References Cited

U.S. PATENT DOCUMENTS

| | | | |
|---|---|---|---|
| 3,722,639 A | * | 3/1973 | Keijzer ........................ 188/315 |
| 3,757,910 A | | 9/1973 | Palmer |
| 3,762,514 A | * | 10/1973 | Freitag ........................ 188/314 |
| 4,113,072 A | | 9/1978 | Palmer |
| 4,826,207 A | | 5/1989 | Yoshioka et al. |
| 4,854,429 A | | 8/1989 | Casey |
| 4,890,858 A | | 1/1990 | Blankenship |
| 4,921,224 A | * | 5/1990 | Fukumura et al. ........... 188/314 |
| 5,285,878 A | | 2/1994 | Scheffel et al. |
| 5,413,196 A | * | 5/1995 | Förster ..................... 188/266.6 |
| 5,586,627 A | | 12/1996 | Nezu et al. |
| 5,588,510 A | * | 12/1996 | Wilke ...................... 188/266.6 |
| 5,655,633 A | | 8/1997 | Nakadate et al. |
| 5,873,437 A | * | 2/1999 | Danek ........................ 188/312 |
| 5,901,820 A | * | 5/1999 | Kashiwagi et al. ....... 188/266.6 |

\* cited by examiner

*Primary Examiner*—Matthew C. Graham
(74) *Attorney, Agent, or Firm*—Harness, Dickey & Pierce, PLC

(57) ABSTRACT

A shock absorber includes a pressure tube with a piston slidably disposed therein. A separate valve includes a fluid circuit for fluid low in rebound and a fluid circuit for fluid flow in compression. Each fluid circuit includes a variable orifice which allows selection between a firm rebound with a soft compression, a soft rebound with a soft compression, and a soft rebound with a firm compression. Each variable orifice is in communication with a blowoff valve in such a manner that they provide a variable blowoff feature to the blowoff valves.

20 Claims, 4 Drawing Sheets

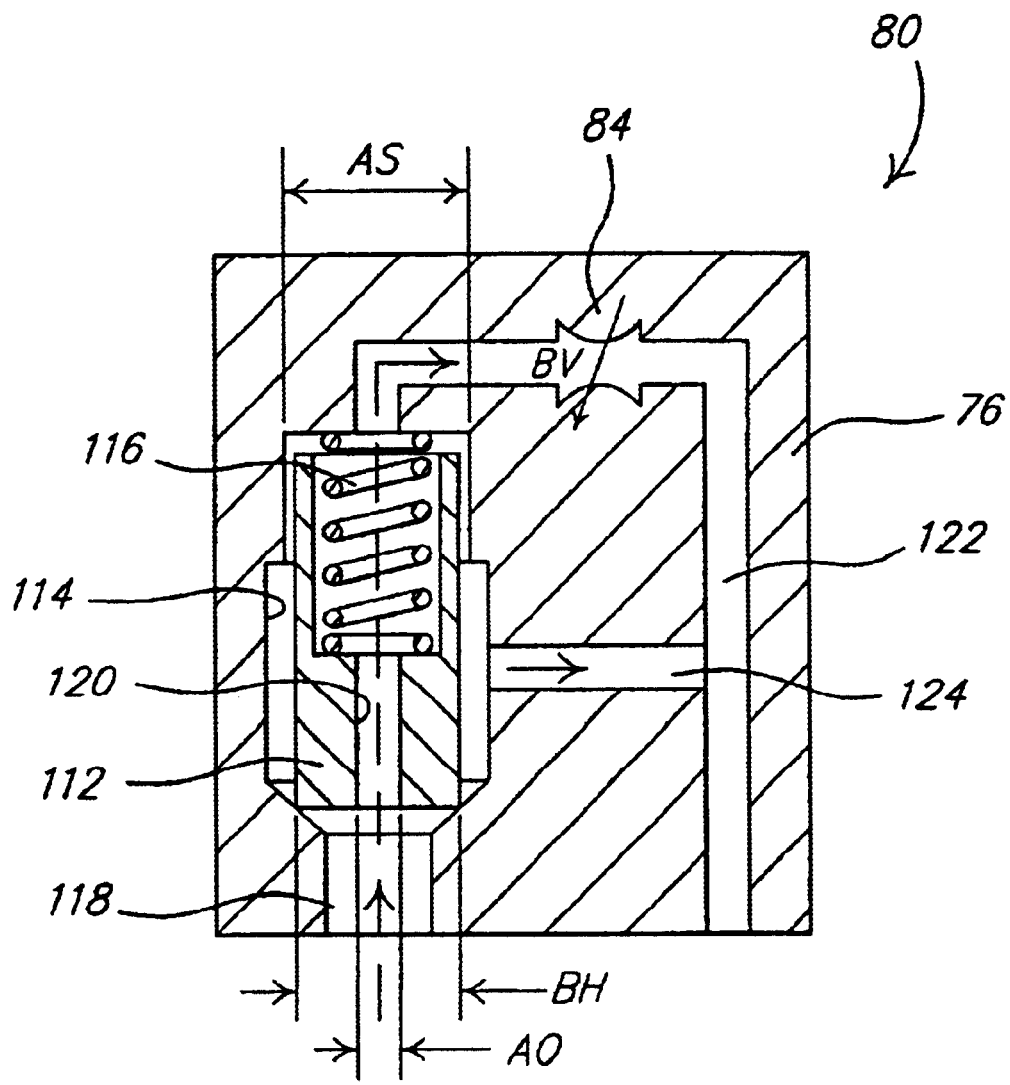

US 6,793,048 B1

SOLENOID ACTUATED CONTINUOUSLY VARIABLE SHOCK ABSORBER

FIELD OF THE INVENTION

The present invention relates to a hydraulic damper or shock absorber adapted for use in a suspension system such as the suspension systems used for automotive vehicles. More particularly, the present invention relates to a hydraulic damper or shock absorber having a continuously variable damping characteristic which is adjustable by a solenoid actuated continuously variable servo valve to vary the damping characteristics between a relatively low level of damping for a soft ride for comfort and a relatively high level of damping for a firm ride for handling.

BACKGROUND OF THE INVENTION

A conventional prior art hydraulic damper or shock absorber comprises a cylinder which is adapted at one end for attachment to the sprung or unsprung mass of a vehicle. A piston is slidably disposed within the cylinder with the piston separating the interior of the cylinder into two fluid chambers. A piston rod is connected to the piston and extends out of one end of the cylinder where it is adapted for attachment to the other of the sprung or unsprung mass of the vehicle.

Various types of adjustment mechanisms have been developed to generate variable damping forces in relation to the speed and/or the amplitude of the displacement of the sprung mass in relation to the unsprung mass. These adjustment mechanisms have mainly been developed to provide a relatively small or low damping characteristic during the normal steady state running of the vehicle and a relatively large or high damping characteristic during vehicle maneuvers requiring extended suspension movements. The normal steady state running of the vehicle is accompanied by small or fine vibrations of the unsprung mass of the vehicle and thus the need for a soft ride or low damping characteristic of the suspension system to isolate the sprung mass from these small vibrations. During a turning or braking maneuver, as an example, the sprung mass of the vehicle will attempt to undergo a relatively slow and/or large movement or vibration which then requires a firm ride or high damping characteristic of the suspension system to support the sprung mass and provide stable handling characteristics to the vehicle. These adjustable mechanisms for the damping rates of a shock absorber offer the advantage of a smooth steady state ride by isolating the high frequency/small amplitude excitations from the unsprung mass while still providing the necessary damping or firm ride for the suspension system during vehicle maneuvers causing low frequency/large excitations of the sprung mass.

The continued development of shock absorbers includes the development of adjustment systems which provide the vehicle designer with a continuously variable system which can be specifically tailored to a vehicle to provide a specified amount of damping in relation to various monitored conditions of the vehicle and its suspension system.

SUMMARY OF THE INVENTION

The present invention provides the art with a continuously variable adjustable hydraulic damper or shock absorber that includes the capability of adjusting the damping rate of the shock absorber between a firm rebound damping force with a soft compression damping force, a soft rebound force with a soft compression damping force and a soft rebound damping force with a firm compression damping force. A solenoid actuated continuously variable servo valve adjusts the damping force characteristics of the shock absorber and has the capability of positioning the damping force characteristics of the shock absorber anywhere between these configurations to provide the continuously variable damping for the shock absorber.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 6 is a cross-sectional side view illustrating a typical poppet valve in accordance with the present invention.

DETAILED DESCRIPTION OF THE PREFERRED EMBODIMENT

Figure 1:
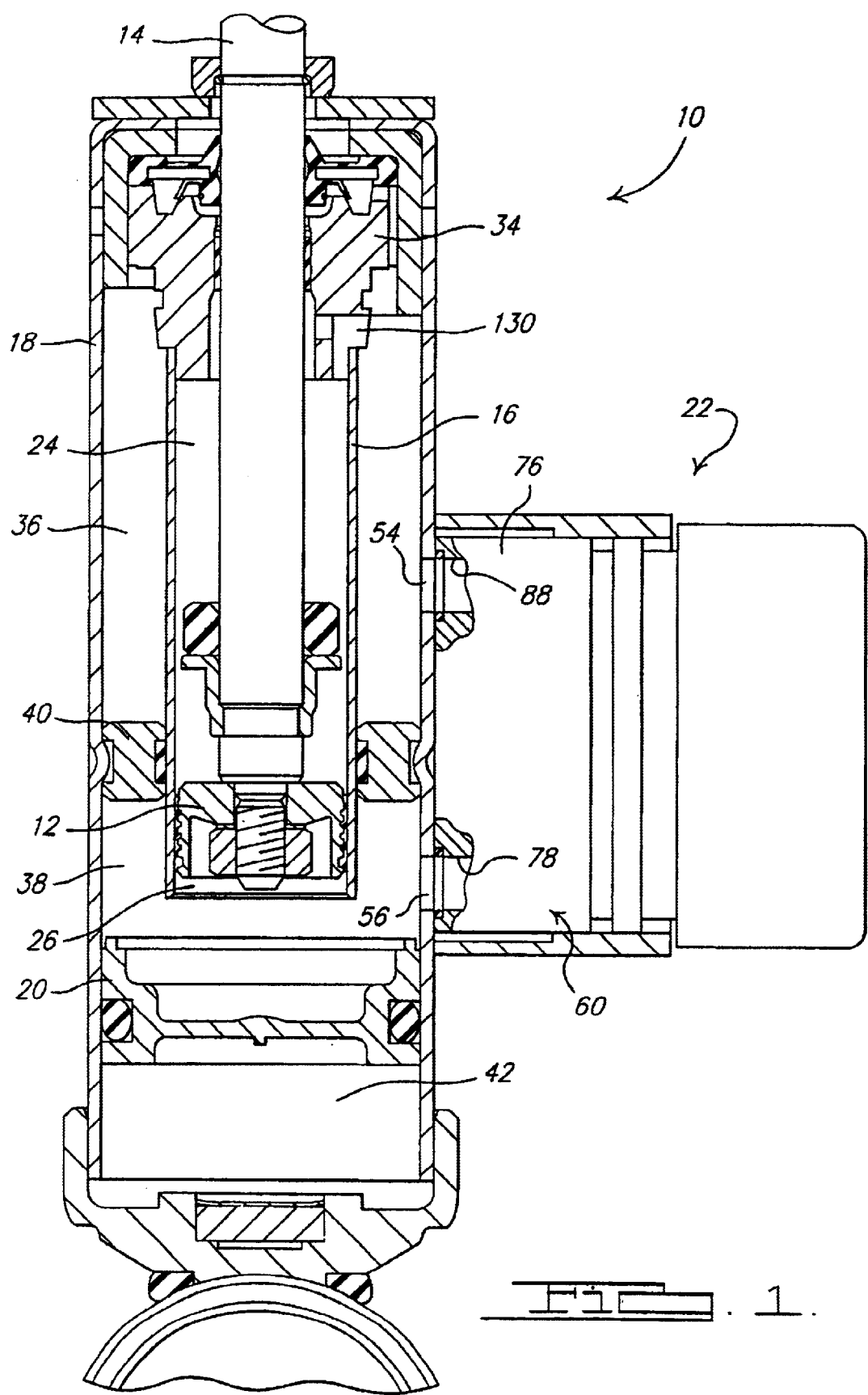
FIG. 1 is a cross-sectional side view of a shock absorber incorporating the continuously variable damping capabilities in a completely damping fluid filled monotube configuration in accordance with the present invention.

Referring now to the drawings in which like reference numerals designate like or corresponding parts throughout the several views, there is shown in FIG. 1 a shock absorber incorporating the continuously variable damping adjustment system in accordance with the present invention which is designated generally by the reference numeral 10. Shock absorber 10 comprises a piston 12, a piston rod 14, a pressure tube 16, an outer tube 18, a floating piston 20 and a continuously variable servo valve assembly 22. Piston 12 is slidingly received within pressure tube 16 and divides pressure tube 16 into an upper working chamber 24 and a lower working chamber 26. Piston 12 does not allow fluid flow between chambers 24 and 26.

Piston rod 14 is attached to piston 12 and extends out of pressure tube 16 and outer tube 18 through a rod guide 34. The outer end of piston rod 14 is adapted to be attached to either the sprung mass or the unsprung mass of the vehicle by means known well in the art. Outer tube 18 surrounds pressure tube 16 and with pressure tube 16 defines an upper intermediate chamber 36 and a lower intermediate chamber 38. Outer tube 18 is adapted for attachment to the other of the sprung mass or the unsprung mass of the vehicle by methods known well in the art. A sealing ring or housing 40 is sealingly disposed between outer tube 18 and pressure tube 16 to isolate upper intermediate chamber 36 from lower intermediate chamber 38. As can be seen in FIG. 1, lower working chamber 26 extends out of the lower end of pressure tube 16 to communicate with lower intermediate chamber 38 which is defined by housing 40, outer tube 18 and floating piston 20. Floating piston 20 is slidingly and sealingly disposed within outer tube 18 to define the lower boundary of lower intermediate chamber 38 and a gas chamber 42 located below floating piston 20. Floating piston 20 moves within outer tube 18 to adjust for the rod volume during the stroking of piston 12 as is well know in the art. Outer tube 18 defines a rebound outlet 54 in communication with upper intermediate chamber 36 and a compression outlet 56 in communication with lower intermediate chamber 38.

Figure 2:
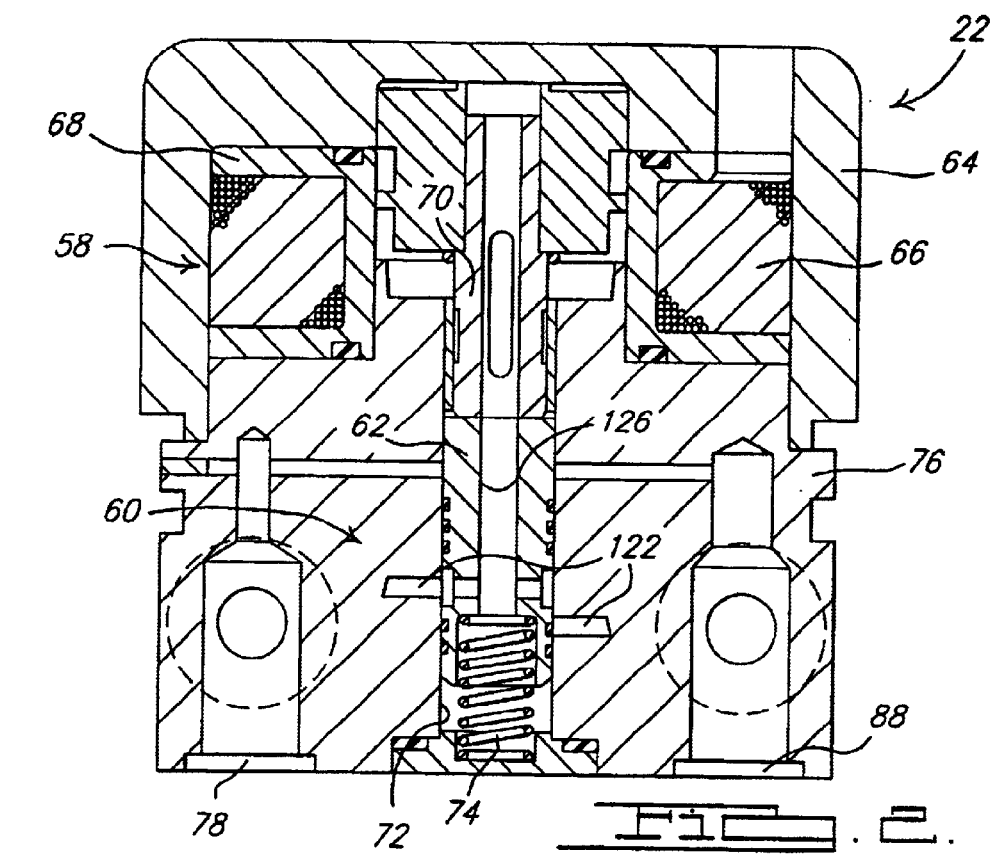
FIG. 2 is a schematic side view illustrating the servo valve shown in FIG. 1 when the shock absorber is configured to provide a firm ride during rebound and a soft ride during compression of the shock absorber.

Referring now to FIGS. 1 and 2, continuously variable servo valve assembly 22 is sealingly secured to outer tube 18. Continuously variable servo valve assembly 22 comprises a solenoid coil assembly 58, a valve body assembly 60 and a spool valve 62. Solenoid coil assembly 58 includes a housing 64 within which is contained a set of windings 66 and a bobbin 68. A valve member 70 is disposed within the set of windings 66 and moves axially within windings 66 in response to electrical power being supplied to windings 66 as is well known in the art. Solenoid coil assembly 58 is attached to valve body assembly 60. Spool valve 62 is disposed within a bore 72 extending through valve body assembly 60. A spring 74 biases spool valve 62 towards solenoid coil assembly 58. Thus, solenoid coil assembly 58 operates to move spool valve 62 axially within bore 72 of valve body assembly 60. Spool valve 62 is normally in an upper position as shown in FIG. 2 and is movable to a lower position as shown in FIG. 4 when full power is being supplied to solenoid coil assembly 58. By the use of pulse width modulation, the position of spool valve 62 can be intermediate the positions shown in FIGS. 2 and 4 which is the position shown in FIG. 3.

Figure 5:
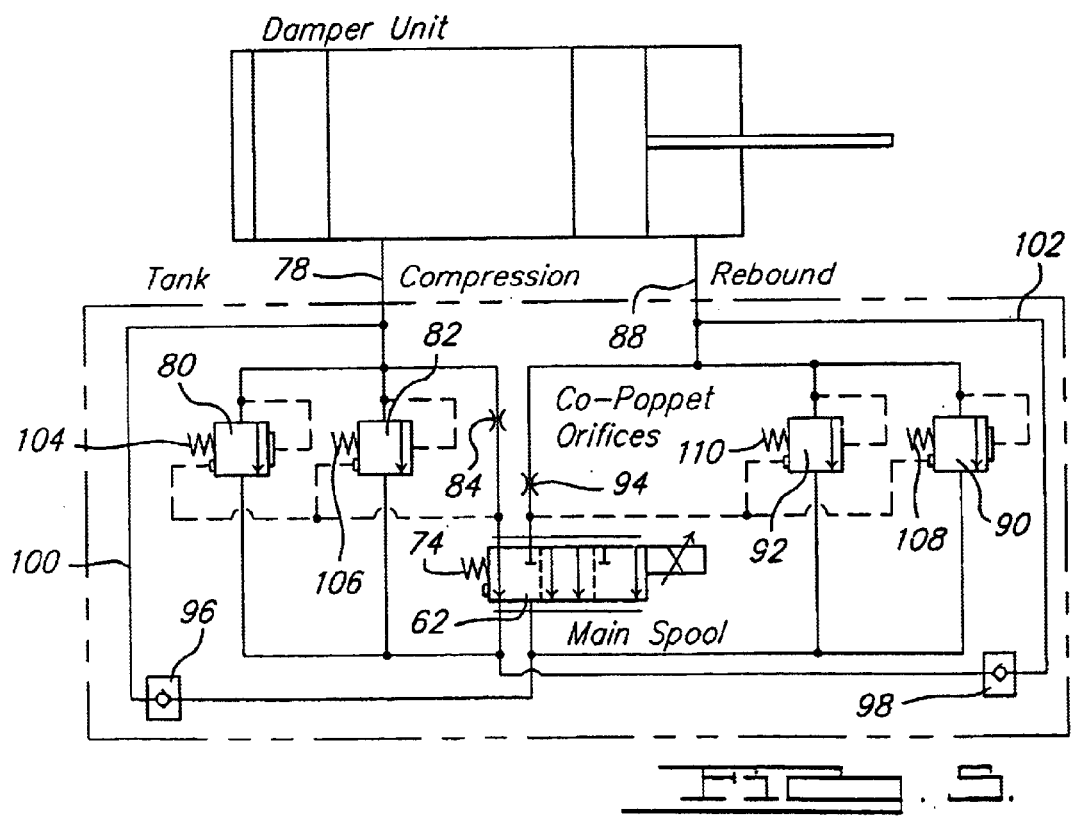
FIG. 5 is a schematic view illustrating the hydraulic fluid circuit incorporated into the shock absorber shown in FIG. 1.

Referring now to FIGS. 2 and 5, valve body assembly 60 comprises a valve body 76, a compression inlet 78, a compression main poppet 80, a compression co-poppet 82, a compression orifice 84, a rebound inlet 88, a rebound main poppet 90, a rebound co-poppet 92 and a rebound orifice 94. A one-way check valve 96 is disposed between compression inlet 78 and spool valve 62. Check valve 96 permits flow from spool valve 62 to compression inlet 78 but prohibits fluid flow directly from compression inlet 78 to spool valve 62. Fluid flow is permitted from compression inlet 78 to spool valve 62 by way of compression main poppet 80, compression co-poppet 82 and compression orifice 84. Check valve 96 also permits fluid flow from rebound main poppet 90 and rebound co-poppet 92. A one way check valve 98 is disposed between rebound inlet 88 and spool valve 62. Check valve 98 permits flow from spool valve 62 to rebound inlet 88 but prohibits fluid flow directly from rebound inlet 88 to spool valve 62. Fluid flow is permitted from rebound inlet 88 to spool valve 62 by way of rebound main poppet 90, rebound co-poppet 92 and rebound orifice 94. Check valve 98 also permits fluid flow from compression main poppet 80 and compression co-poppet 82. Valve body assembly 60 is positioned such that valve body 76 sealingly engages outer tube 18 with compression inlet 78 sealingly engaging compression outlet 56 and with rebound inlet 88 sealingly engaging rebound outlet 54. A fluid passageway 100 extends between and fluidly connects spool valve 62 and lower working chamber 26 through check valve 96, compression inlet 78, compression outlet 56 and lower intermediate chamber 38. A fluid passage 102 extends between and fluidly connects spool valve 62 and upper working chamber 24 through check valve 98, rebound inlet 88, rebound outlet 54 and upper intermediate chamber 36.

Referring now to FIG. 5, a fluid schematic diagram is shown. Fluid flow through compression inlet 78 is directed to compression main poppet 80, compression co-poppet 82 and compression orifice 84. Fluid flow through compression main poppet 80 and compression co-poppet 82 is directed to upper working chamber 24 through passage 102. Fluid flow through compression orifice 84 is directed through spool valve 62 and then to upper working chamber 24 through passage 102. Compression main poppet 80 is urged to a closed position by a biasing member 104 and the fluid pressure present at a point between compression orifice 84 and spool valve 62. Fluid pressure from compression inlet 78 urges compression main poppet 80 towards an open position. In a similar manner, compression co-poppet 82 is urged into a closed position by a biasing member 106 and the fluid pressure between compression orifice 84 and spool valve 62. Fluid pressure from compression inlet 78 also urges compression co-poppet 82 toward an open position. Thus by controlling the amount of fluid allowed to pass from compression inlet 78 to upper working chamber 24 through compression orifice 84, the fluid pressure urging compression main poppet 80 and compression co-poppet 82 towards the open position can be controlled. Fluid flow through rebound inlet 88 is directed to rebound main poppet 90, rebound co-poppet 92 and rebound orifice 94. Fluid flow through rebound main poppet 90 and rebound co-poppet 92 is directed to lower working chamber 26 through passage 100. Fluid flow through rebound orifice 94 is directed through spool valve 62 and then to lower working chamber 26 through passage 100. Rebound main poppet 90 is urged to a closed position by a biasing member 108 and the fluid pressure present at a point between rebound orifice 94 and spool valve 62. Fluid pressure from rebound inlet 88 urges rebound main poppet 90 towards an open position. In a similar manner, rebound co-poppet 92 is urged toward a closed position by a biasing member 110 and the fluid pressure present at a position between rebound orifice 94 and spool valve 62. Fluid pressure from rebound inlet 88 also urges rebound co-poppet 92 towards an open position. Thus by controlling the amount of fluid allowed to pass from rebound inlet 88 to lower working chamber 26 through rebound orifice 94, the fluid pressure urging rebound main poppet 90 and rebound co-poppet 92 towards the open position can be controlled.

During the operation of shock absorber 10, there is no damping force characteristic in either rebound or compression that is determined by piston 12. Piston 12 is a solid piston without passages and valving between upper and lower working chambers 24 and 26, respectively. Continuously variable servo valve assembly 22 determines the damping force characteristics for shock absorber 10. The damping force characteristics for shock absorber 10 are controllable by continuously variable servo valve assembly 22 such that in any given complete stroke of shock absorber 10 (rebound to compression to rebound) depending on the amount of current given to energize solenoid coil assembly 58. When little or no current is supplied to solenoid coil assembly 58, continuously variable servo valve assembly 22 generates a firm rebound damping force with a soft compression damping force for shock absorber 10. When full current to solenoid coil assembly 58 is supplied, continuously variable servo valve assembly 22 generates a soft rebound damping force with a firm compression damping force for shock absorber 10.

Another characteristic of continuously variable servo valve assembly 22 is that when a continuously variable energy signal (through pulse width modulation) is provided to solenoid coil assembly 58, a continuously variable sloping bleed and a continuously variable blowoff for poppets 80, 82, 90 and 92 are provided. The basis for this characteristic is shown in FIG. 6.

FIG. 6 discloses schematically compression main poppet 80. While FIG. 6 is directed to compression main poppet 80, it is to be understood that compression co-poppet 82, rebound main poppet 90 and rebound co-poppet 92 operate in a similar manner to main poppet 80. Compression main poppet 80 includes a valve member 112 disposed within a bore 114 in valve body 76 of valve body assembly 60. A spring 116 urges valve member 112 into a closed position as shown in FIG. 6. Fluid flow from compression inlet 78 is directed to a fluid inlet 118, through an internal bore 120 in valve member 112, and then to compression orifice 84. From compression orifice 84, fluid flows back to intermediate chamber 36 through a passage 122. A blowoff passage 124 extends from bore 114 to passage 122 to allow fluid flow when valve member 112 is moved to an open position.

Figure 3:
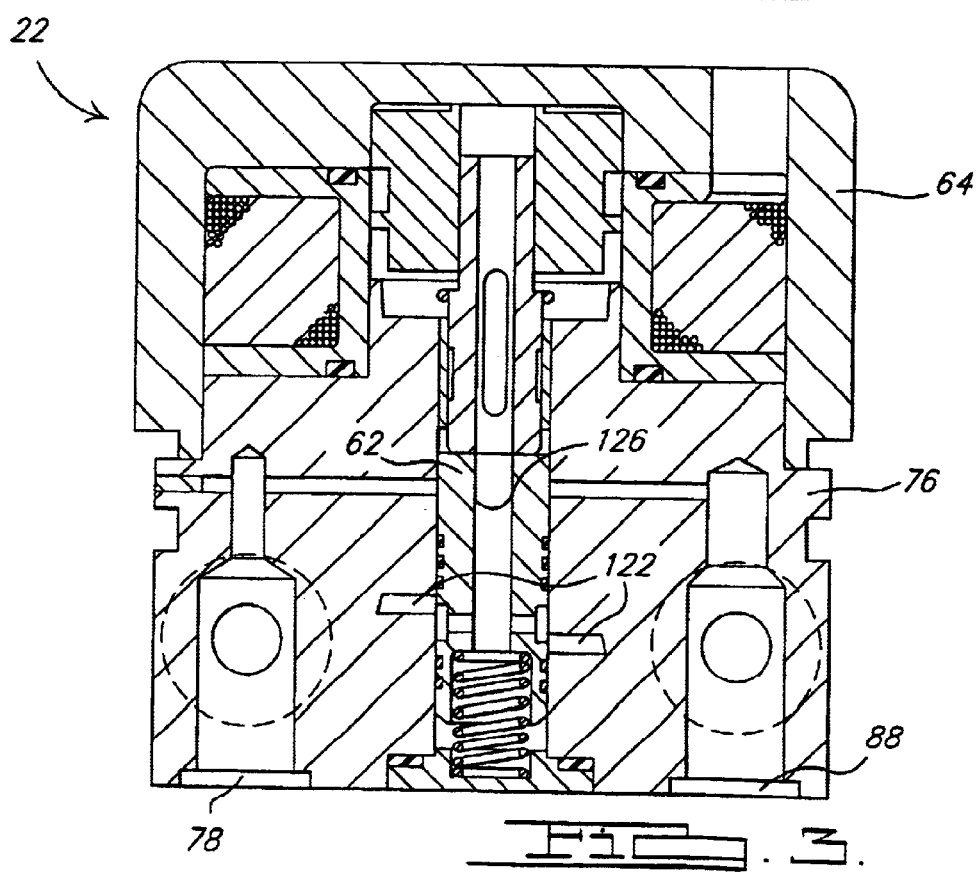
FIG. 3 is a cross-sectional side view illustrating the servo valve shown in FIG. 1 when the shock absorber is configured to provide a soft ride during rebound and a soft ride during compression of the shock absorber.
Figure 4:
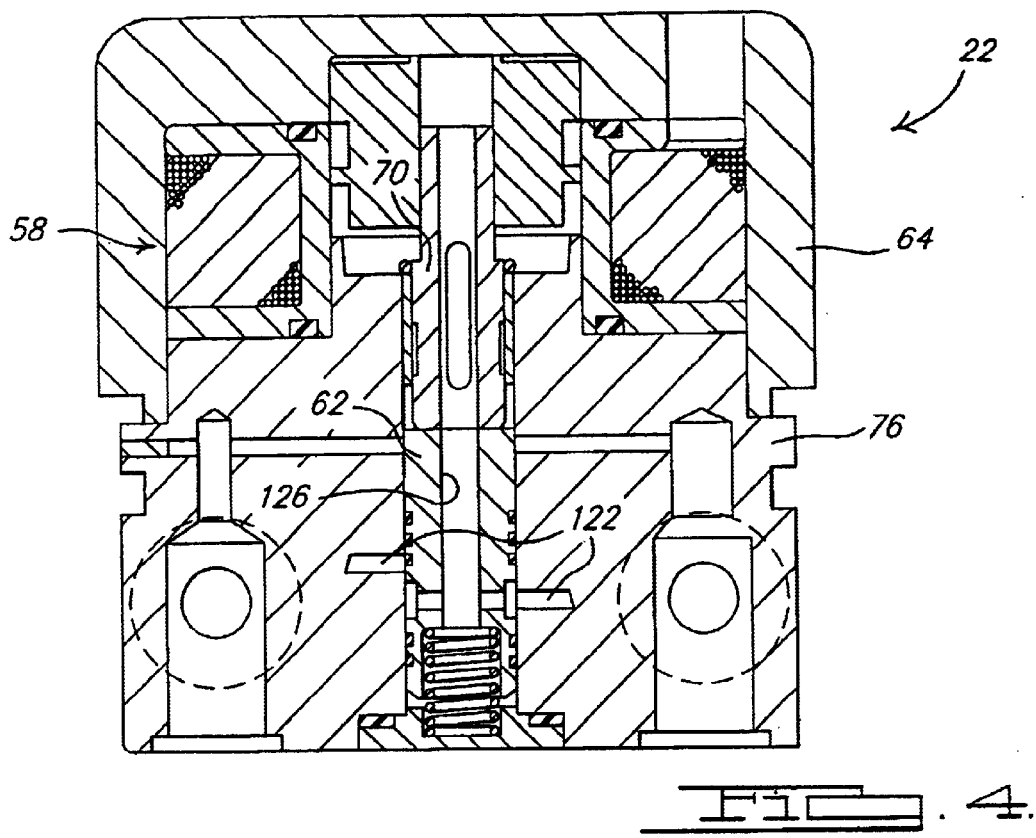
FIG. 4 is a cross-sectional side view illustrating the servo valve shown in FIG. 1 when the shock absorber is configured to provide a soft ride during rebound and a firm ride during compression of the shock absorber.

The amount of fluid flow allowed through compression orifice 84 and rebound orifice 94 will be determined by the position of spool valve 62 as shown in FIGS. 2–4. In FIGS. 2–4, passage 122 adjacent rebound inlet 88 returns fluid from passage 122 of rebound poppets 90 and 92 as well as from rebound orifice 94. Passage 122 shown adjacent compression inlet 78 returns fluid from passage 122 of compression poppets 80 and 82 as well as from compression orifice 84. FIG. 2 shows spool valve 62 positioned to fully open compression orifice 84 and fully close rebound orifice 94. Thus, a soft compression damping force and a firm rebound damping force are provided. Fluid is free to flow through compression orifice 84, through a bore 126 extending through spool valve 62, through bore 72 of valve body assembly 58, through passageway 102 and into upper working chamber 24 to provide soft compression damping. Fluid is prohibited from flowing through rebound orifice 94 thus providing firm compression damping. FIG. 3 shows spool valve 62 positioned to open both compression orifice 84 and rebound orifice 94. Thus a soft compression damping force and a soft rebound damping force are provided. Fluid is free to flow through both compression orifice 84 into upper working chamber 24 and through rebound orifice 94 to lower working chamber 26 as described above to provide soft compression and rebound damping. FIG. 4 shows spool valve 62 positioned to fully close compression orifice 84 and fully open rebound orifice 94. Thus, a firm compression damping force and a soft rebound damping force are provided. Fluid is prohibited from flowing through compression orifice 84 to provide firm compression damping. Fluid is free to flow through rebound orifice 94 into lower working chamber 26 as described above to provide soft rebound damping. The amount of firm and/or soft damping provided will be determined by the position of spool valve 62 which in turn is determined by the amount of current being supplied to solenoid coil assembly 58. Preferably, the amount of current to solenoid coil assembly 58 is controlled using pulse width modulation.

Referring now to FIG. 6, the amount of flow through spool valve 62 also contributes to the damping force blowoff level according to the following formula:

$$Q = \alpha \sqrt{\frac{F}{P\left(\frac{AS}{BH^2}\right)}}$$

In the above formula:
Q=the blowoff level
α=flow coefficient of damping fluid
F=force
P=pressure
AS=diameter of bore 114
BH=diameter of valve member 112
AO=diameter of bore 120
BV=area of orifice 84 or 94 which is open By varying the amount of flow through orifice 84 or 94, a variable amount of back pressure is produced to pressure regulated compression main poppet 80. The amount of force or fluid pressure required to displace valve member 112 and move it to its open position is determined by the area deferential of the upstream pressure face versus the downstream pressure face. By continuously varying the pressure on the downstream pressure face through the movement of spool valve 62, the amount of force required to displace valve member 112 can be continuously varied thus resulting in a continuously variable damping force blowoff level. Thus, compression main poppet 80, as well as compression co-poppet 82, rebound main poppet 90 and rebound co-poppet 92 operate as blowout valves.

In order to completely separate the operation of continuously variable servo valve assembly 22 from rebound to compression, a complete separation of the fluid flow of the rebound to the fluid flow of the compression of the shock absorber 10 is required. A description of fluid flow during the rebound stroke and the compression stroke is detailed below.

Referring now to FIGS. 1 and 5, during the rebound stroke, because there is no valving in piston 12, fluid is forced through a passage 130 formed in rod guide 34 and into upper intermediate chamber 36. The fluid enters upper intermediate chamber 36 which is concentric with working chambers 24 and 26. Fluid exits through rebound outlet 54 and enters rebound inlet 88 of continuously variable servo valve assembly 22. After entering rebound inlet 88, fluid flows to rebound main poppet 90, to rebound co-poppet 92 and to rebound orifice 94. As described above, the amount of flow through rebound orifice 94 is controlled by the position of spool valve 62 to control the damping characteristics from a soft ride to a firm ride. Fluid flowing through continuously variable servo valve assembly 22 is directed to lower intermediate chamber 38 and lower working chamber 26. The rebound movement of piston 12 creates a low pressure within lower working chamber 26 and intermediate chamber 38. Fluid leaving continuously variable servo valve assembly 22 through compression inlet 78 is allowed to enter lower working chamber 26 to replenish the fluid on the bottom side of piston 12. Floating piston 20 moves axially within outer tube 18 to compensate for the rod volume.

During the compression stroke, because there is no valving in piston 12, fluid is forced from lower working chamber 26 into lower intermediate chamber 38. The fluid enters lower intermediate chamber 38 which is concentric with working chambers 24 and 26. Fluid exits through compression outlet 56 and enters compression inlet 78 of continuously variable servo valve assembly 22. After entering compression inlet 78, fluid flows to compression main poppet 80, compression co-poppet 82 and to compression orifice 84. As described above, the amount of flow through compression orifice 84 is controlled by the position of spool valve 62 to control the damping characteristics from a soft ride to a firm ride. Fluid flowing through continuously variable servo valve assembly 22 is directed to upper intermediate chamber 36 and upper working chamber 24. The compression movement of piston 12 creates a low pressure within upper working chamber 24 and upper intermediate chamber 36. Fluid leaving continuously variable servo valve assembly 22 through rebound inlet 88 is allowed to enter upper intermediate chamber 36 to replenish the fluid on the top side of piston 12 via passage 130 in rod guide 34 which extends between upper working chamber 24 and upper intermediate chamber 36. Floating piston 20 moves axially within outer tube 18 to compensate for the rod volume.

The above construction for shock absorber 10 thus provides an infinitely variable solenoid actuated continuously variable shock absorber. Some, but not all of the advantages of this contraction are given below. First, shock absorber 10 provides a greater differentiation from soft to firm damping forces in compression due to the introduction of separate compression flow passages and check valves. Second, shock absorber 10 provides for a separately tunable rebound and compression valving. Third, shock absorber 10 provides soft compression damping forces and firm rebound damping forces during the same stroke. Conversely, firm compression damping forces and soft rebound damping forces during the same stroke are also available. In addition, shock absorber 10 does not require any piston valving system. Fifth, shock absorber 10 allows for continuously variable bleed and blowoff features. Sixth, continuously variable servo valve assembly 22 differentiates between compression strokes and rebound strokes.

While the above detailed description describes the preferred embodiment of the present invention, it should be understood that the present invention is susceptible to modification, variation and alteration without deviating from the scope and fair meaning of the subjoined claims.

What is claimed is:

1. An adjustable shock absorber comprising:
    a pressure tube defining a working chamber;
    a piston rod extending through said pressure tube and into said working chamber;
    a valveless piston slidably disposed within said pressure tube and connected to said piston, said piston dividing said working chamber into an upper working chamber and a lower working chamber;
    a valve assembly separate from said piston in communication with said upper and lower working chambers, said valve assembly including a first variable orifice disposed in a first fluid path extending directly between said upper working chamber and said lower working chamber for controlling flow from said upper working chamber to said lower working chamber and a second variable orifice disposed in a second fluid path extending directly between said lower working chamber and said upper working chamber for controlling flow from said lower working chamber to said upper working chamber, said second fluid path being separate from said first fluid path.

2. The adjustable shock absorber according to claim 1 wherein, said valve assembly includes a solenoid valve having means for controlling said first variable orifice.

3. The adjustable shock absorber according to claim 2 wherein, said means for controlling said first variable orifice includes a spool valve.

4. The adjustable shock absorber according to claim 2 wherein, said solenoid valve includes means for controlling said second variable orifice.

5. The adjustable shock absorber according to claim 4 wherein, said means for controlling said first and second orifices include a spool valve.

6. The adjustable shock absorber according to claim 1 wherein, said valve assembly includes a first variable blowoff valve in communication with said upper working chamber.

7. The adjustable shock absorber according to claim 6 wherein, said first variable blowoff valve in communication with said lower working chamber.

8. The adjustable shock absorber according to claim 6 wherein, said valve assembly includes a solenoid valve having means for controlling said first variable orifice.

9. The adjustable shock absorber according to claim 8 wherein, said means for controlling said first variable orifice includes a spool valve.

10. The adjustable shock absorber according to claim 8 wherein, said solenoid valve includes means for controlling said second variable orifice.

11. The adjustable shock absorber according to claim 6 wherein, said valve assembly includes a second blowoff valve in communication with said lower working chamber.

12. The adjustable shock absorber according to claim 11 wherein, said first variable blowoff valve is in communication with said lower working chamber and said second blowoff valve is in communication with said upper working chamber.

13. The adjustable shock absorber according to claim 11 wherein, said valve assembly includes a solenoid valve having means for controlling said first variable orifice.

14. The adjustable shock absorber according to claim 13 wherein, said means for controlling said first variable orifice includes a spool valve.

15. The adjustable shock absorber according to claim 14 wherein, said solenoid valve includes means for controlling said second variable orifice.

16. The adjustable shock absorber according to claim 1 wherein, said first variable orifice is in communication with said lower working chamber.

17. The adjustable shock absorber according to claim 16 wherein, said second variable orifice is in communication with said upper working chamber.

18. The adjustable shock absorber according to claim 1, wherein said shock absorber includes an outer tube surrounding said pressure tube, said outer tube defining an upper intermediate chamber in communication with said upper working chamber and a lower intermediate chamber in communication with said lower working chamber.

19. The adjustable shock absorber according to claim 18, wherein said shock absorber includes a piston slidably disposed within said outer tube.

20. The adjustable shock absorber according to claim 18, wherein said shock absorber includes a sealing ring disposed between said outer tube and said pressure tube, said sealing ring prohibiting fluid communication between said upper intermediate chamber and said lower intermediate chamber.

* * * * *